US012137633B2

(12) United States Patent
Geurts

(10) Patent No.: US 12,137,633 B2
(45) Date of Patent: Nov. 12, 2024

(54) HARVESTING DEVICE AND METHOD FOR HARVESTING FRUIT HANGING FROM A PLANT

(71) Applicant: FINE FIELD B.V., Melderslo (NL)

(72) Inventor: Peter Johannes Lodewijk Geurts, Horst (NL)

(73) Assignee: FINE FIELD B.V., Melderslo (NL)

( * ) Notice: Subject to any disclaimer, the term of this patent is extended or adjusted under 35 U.S.C. 154(b) by 98 days.

(21) Appl. No.: 17/425,821

(22) PCT Filed: Jan. 30, 2020

(86) PCT No.: PCT/NL2020/050053
§ 371 (c)(1),
(2) Date: Jul. 26, 2021

(87) PCT Pub. No.: WO2020/159370
PCT Pub. Date: Aug. 6, 2020

(65) Prior Publication Data
US 2022/0248603 A1    Aug. 11, 2022

(30) Foreign Application Priority Data
Jan. 30, 2019   (NL) .................................... 2022481

(51) Int. Cl.
*A01D 46/26*   (2006.01)
*A01D 46/28*   (2006.01)

(52) U.S. Cl.
CPC ........... *A01D 46/264* (2013.01); *A01D 46/28* (2013.01)

(58) Field of Classification Search
CPC .............................. A01D 46/264; A01D 46/28
See application file for complete search history.

(56) References Cited

U.S. PATENT DOCUMENTS 2,435,498 A * 2/1948 Hapman ................ B65G 47/40
198/710
3,105,342 A * 10/1963 Hahn ..................... A01D 46/26
56/328.1
(Continued)

FOREIGN PATENT DOCUMENTS

CN     110831429 A    2/2020
EP       2462796 A1    6/2012
(Continued)

OTHER PUBLICATIONS

International Search Report and Written Opinion for the International Patent Application No. PCT/NL2020/050053, mailed Apr. 24, 2020, 11 pages.
(Continued)

*Primary Examiner* — Thomas B Will
*Assistant Examiner* — Julia C Tran
(74) *Attorney, Agent, or Firm* — KDW Firm PLLC

(57) ABSTRACT

A harvesting device for harvesting fruit hanging from a plant, includes a frame which is displaceable in a transport direction and carries a loop-like conveyor track which can be driven in circular manner, and at least one harvesting bin connected to the conveyor track. The conveyor track lies in a plane which is substantially parallel to the transport direction and which lies at a first acute angle to the horizon in a direction transversely of the transport direction during normal use of the harvesting device. A method for harvesting fruit hanging from a plant, wherein the harvesting device is used.

20 Claims, 12 Drawing Sheets

(56) References Cited

U.S. PATENT DOCUMENTS

| | | | | |
|---|---|---|---|---|
| 3,351,151 A * | 11/1967 | Miller, Jr. | ............... | A01B 75/00 |
| | | | | 280/43.23 |
| 3,439,482 A | 4/1969 | Orton | | |
| 3,460,332 A * | 8/1969 | Denisen | ................. | A01D 46/00 |
| | | | | 56/130 |
| 3,521,438 A | 7/1970 | Adrian | | |
| 3,538,694 A | 11/1970 | Holloway | | |
| 3,553,949 A | 1/1971 | Rauth | | |
| 3,601,965 A | 8/1971 | Kaessbohrer | | |
| 3,685,266 A * | 8/1972 | Mohn | ................... | A01D 46/28 |
| | | | | 56/330 |
| 3,690,054 A | 9/1972 | De Carlo | | |
| 3,756,002 A * | 9/1973 | Mecca | ................... | A01D 46/28 |
| | | | | 56/330 |
| 3,772,866 A | 11/1973 | Sell | | |
| 3,777,463 A * | 12/1973 | Claxton | ................. | A01D 46/28 |
| | | | | 56/330 |
| 3,815,343 A | 6/1974 | Sell | | |
| 3,822,537 A | 7/1974 | Sell | | |
| 3,901,005 A * | 8/1975 | Rohrbach | ............... | A01D 46/28 |
| | | | | 141/324 |
| 4,130,982 A | 12/1978 | Clary | | |
| 4,150,526 A | 4/1979 | Burton | | |
| 4,176,511 A * | 12/1979 | Scudder | ................. | A01D 46/28 |
| | | | | 56/330 |
| 4,702,065 A | 10/1987 | Littau | | |
| 4,736,574 A * | 4/1988 | Walker | ................. | A01D 46/243 |
| | | | | 56/328.1 |
| 4,890,722 A * | 1/1990 | Gough | ................. | B65G 17/485 |
| | | | | 198/712 |
| 4,944,387 A * | 7/1990 | Burke | .................... | A01D 46/28 |
| | | | | 198/708 |
| 5,109,657 A | 5/1992 | DeVries | | |
| 5,181,373 A | 1/1993 | Littau | | |
| 5,495,708 A | 3/1996 | Scott | | |
| 6,282,878 B1 * | 9/2001 | Hill | ........................ | A01D 46/26 |
| | | | | 56/329 |
| 6,421,995 B1 | 7/2002 | Sancho | | |
| 6,865,872 B2 | 3/2005 | Youman | | |
| 8,117,814 B2 | 2/2012 | Sidhu | | |
| 9,750,188 B2 | 9/2017 | Takeda | | |
| 2015/0181807 A1 | 7/2015 | Driessen | | |
| 2017/0231159 A1 | 8/2017 | Williamson | | |
| 2019/0208706 A1 | 7/2019 | Delran | | |

FOREIGN PATENT DOCUMENTS

| | | |
|---|---|---|
| FR | 2658381 A1 | 8/1991 |
| GB | 1588957 A | 5/1981 |
| GB | 2281493 A | 3/1995 |
| WO | 2007021271 A1 | 2/2007 |
| WO | 2014012788 A1 | 1/2014 |
| WO | 2022184861 A1 | 9/2022 |

OTHER PUBLICATIONS

International Search Report and Written Opinion for the International Patent Application No. PCT/NL2020/050054, mailed Apr. 29, 2020, 10 pages.

* cited by examiner

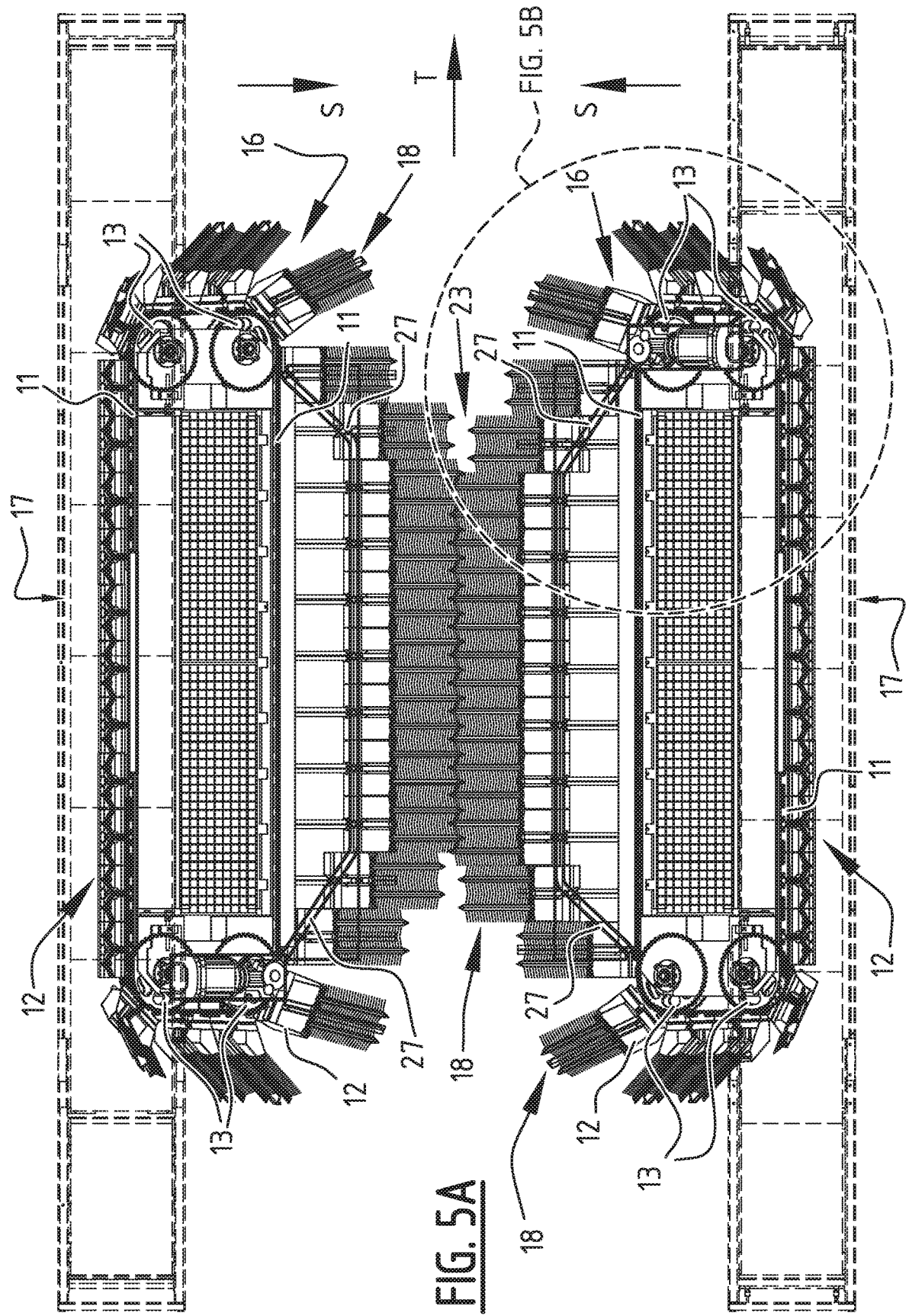

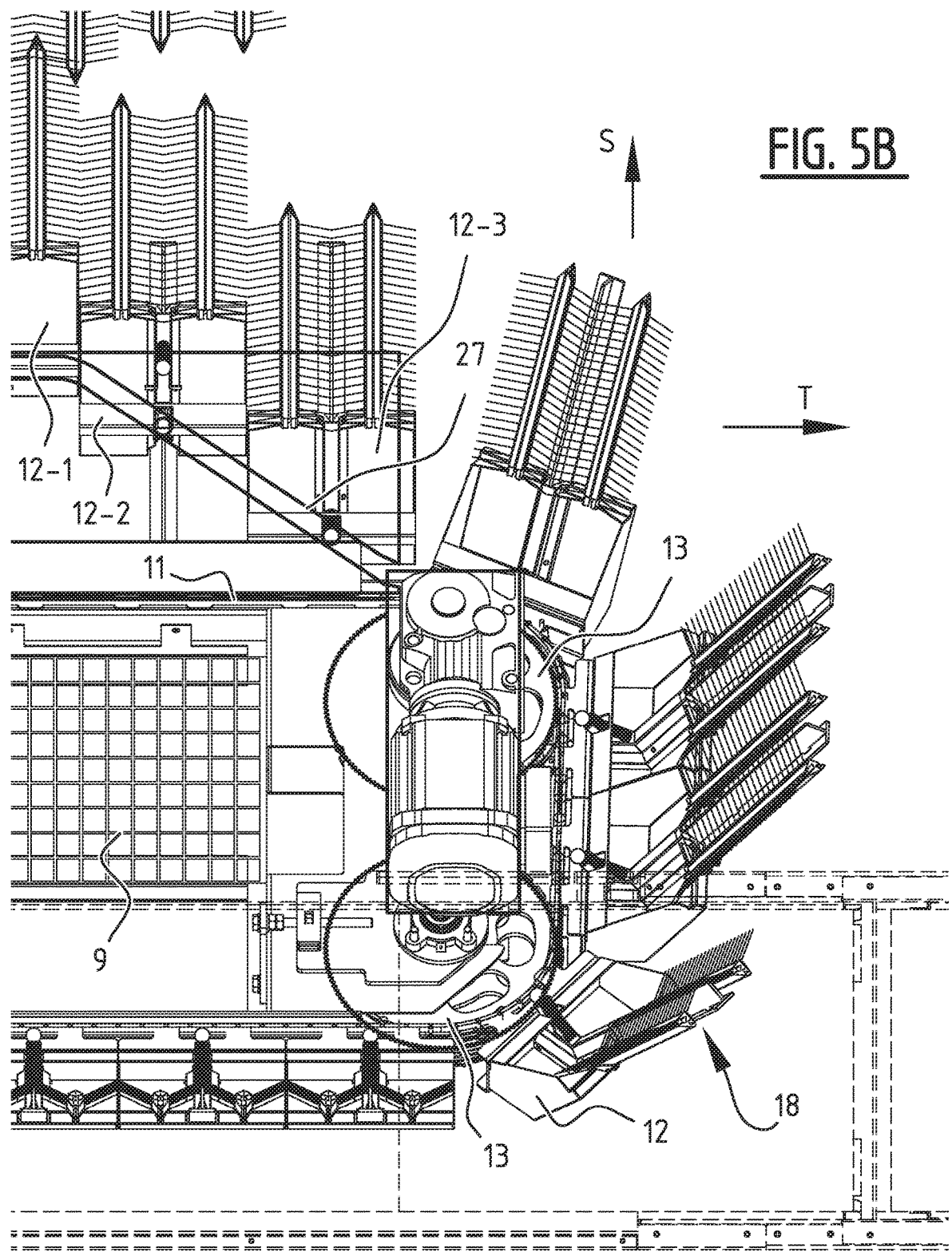

HARVESTING DEVICE AND METHOD FOR HARVESTING FRUIT HANGING FROM A PLANT

This is a national stage application filed under 35 U.S.C. § 371 of pending international application PCT/NL2020/050053, filed Jan. 30, 2020, which claims priority to Netherlands Patent Application No. NL 2022481, filed Jan. 30, 2019, the entirety of which applications are hereby incorporated by reference herein.

The invention relates to a harvesting device for harvesting fruit hanging from a plant.

Such a harvesting device is per se known from GB 1 588 957 and comprises a frame which is displaceable in a transport direction and carries a loop-like conveyor track which can be driven in circular manner, and at least one harvesting bin connected to the conveyor track. When the conveyor track is driven, it first displaces the harvesting bin through a harvesting segment, counter to the transport direction, and then in a return segment lying under the harvesting segment in the transport direction. When the harvesting bin is in the harvesting segment, the plant is shaken so that fruit falls from the plant and into the harvesting bin. It is important that the harvesting bin encloses the plant as well as possible in order to prevent fruit from falling next to the harvesting bin. This is because fallen fruit is deemed lost, whereby a poor enclosure of the plant results in a greater harvesting loss.

In the known harvesting device the harvesting segment is situated at a relatively great distance from a ground surface, because the return segment is situated under the harvesting segment. This is disadvantageous because it is precisely close to the ground that a plant from which the fruit is be harvested is narrowest and can be enclosed most easily. The plant can thereby in many cases not be enclosed sufficiently closely with the known harvesting device. It also occurs that fruit hangs from the plant relatively low and, when the harvesting segment is positioned to high, is even situated thereunder, whereby this fruit cannot be caught.

Various other harvesting machines are known, these generally consisting of a gantry which can travel over a row of plants and has on either side mechanical shakers and, lying thereunder, catching means, for instance pivotable "scales". In these known harvesting devices, which are known under the collective name "Over The Row (OTR) Harvester", the harvested fruit is transported from the catching means to a crate filler on top of the frame by a system of conveyor belts. These known OTR harvesting devices have the drawback that a relatively high percentage (as much as 30 percent) of the fruit falls next to the catching means and onto the ground, and is lost. In addition, the harvested fruit is often damaged so badly by the mechanical operations that it can no longer be sold as fresh fruit, but has to be industrially processed into for instance preserves or jam, and is thereby worth relatively little money.

The invention therefore has for its object to improve the known harvesting device.

This object is achieved with a harvesting device of the type described in the preamble, wherein the conveyor track lies in a plane which is substantially parallel to the transport direction and which lies at a first acute angle to the horizon in a direction transversely of the transport direction during normal use of the harvesting device.

Due to the acute angle to the horizon, the conveyor track has a low and a high side. The low side is used as harvesting segment, and for this purpose runs close to a plant for harvesting during use. The acute angle is thus defined between the plane in which the conveyor track lies and the horizon, on the underside of the conveyor track. Because the harvesting segment is positioned relatively low, this because the return segment does not run under the harvesting segment, and so thereby relatively close to a ground surface, the plant for harvesting can be enclosed where it is relatively narrow, which results in less loss of fruit, since fruit will fall less easily to the side of the at least one harvesting bin. By driving the conveyor track in circular manner the harvesting bin runs through the harvesting segment, after which, because the conveyor track forms the acute angle with the horizon, the harvesting bin is displaced upward by the track to the high side thereof. Because this side is relatively far removed from a ground surface, fruit can be removed from the harvesting bin in relatively simple manner. This can be done by removing the fruit from the bins, wherein the height of the conveyor track provides for a good accessibility of the harvesting bin, or for instance by pouring the fruit from the harvesting bin. The height position of the harvesting bin is also important here, since, when a catcher is placed sufficiently high, collecting means can for instance be placed thereunder. Finally, the additional height of the return segment can provide an advantage when the harvesting device is used on an uneven ground surface, since the chance of the return segment becoming jammed on for instance a bump in the ground is thus reduced. The acute angle of the conveyor track also has the result that a return segment, which is thus formed by the high side of the conveyor track, is directed away from the plant. The return segment is thereby not in the way of the plant, or vice versa.

In order to ensure that the plane in which the conveyor track lies remains at the same advantageous angle to the horizon, even when the harvesting device is on a non-horizontal ground surface, the frame of the harvesting device can be tiltable relative to a chassis on which the frame supports. The frame can thereby be tilted, optionally automatically, such that the frame is substantially vertical, irrespective of the incline of the ground surface. It goes without saying that the harvesting device need not be adjustable to ground surfaces which are steeper than a desired incline on which the harvesting device must be able to operate.

It is particularly advantageous for at least one catcher to be mounted on the at least one harvesting bin, wherein the at least one catcher comprises a flexible catching element for catching fruit and guiding it to the harvesting bin.

Such a catcher can increase an effective catching surface of the harvesting device by also catching fruit that falls onto the catcher. It is possible to envisage configuring the catcher to guide the fruit to the harvesting bin, for instance by placing it at a suitable angle to the horizon. The flexible catching element can provide one or both of the following advantages. Firstly, the flexible catching element can break the fall of fruit, i.e. ensure that the fruit is caught with a relatively low impact. The fruit is hereby not damaged, or less easily damaged. This is particularly relevant in the case of for instance blueberries, which are very vulnerable. Secondly, the flexible catching element can help to enclose the plant by deforming around the plant, at least around a branch or stem thereof, and closing at least partially therearound. The flexible catching element thereby helps to form an uninterrupted catching surface which forms at least partially around the plant. A large quantity of fruit can thereby be caught. The flexible catching element can for instance be embodied as a brush or a flexible strip.

The catcher preferably has an arm extending away from the harvesting bin in a direction substantially transversely of the transport direction. The flexible catching element then extends conversely from the arm, in the transport direction and/or counter thereto. In this way the arm of the catcher can be extended alongside a stem or branch of a plant, and the flexible catching element encloses it. This embodiment is particularly advantageous for harvesting fruit which grows on bushes, since bushes have a number of branches extending upward from the ground at a distance from each other. In order to be able to catch a large proportion of the fruit, the arm of the catcher can be shifted between the branches of the bush, wherein the flexible catching element provides for a good connection to the branches.

Each harvesting bin preferably has a plurality of catchers, for instance two or more catchers.

The harvesting device preferably comprises a plurality of harvesting bins and preferably a plurality of catchers, wherein adjacent harvesting bins and catchers connect at least substantially to each other along at least a part of the conveyor track. In this way a continuous catching surface of a plurality of harvesting bins and optionally catchers can be formed along that part of the conveyor track, the above discussed harvesting segment, whereby a lot of fruit can be caught at the same time. A plant for harvesting can hereby be almost wholly enclosed. In this way it is particularly possible to harvest a plurality of plants, for instance two or more plants, simultaneously. The catchers and/or harvesting bins connecting to each other means that they lie so close together, at least along the stated part of the conveyor track, that fruit for harvesting cannot fall between the catchers and/or harvesting bins.

The harvesting device is preferably embodied such that the at least one catcher and/or the at least one harvesting bin is displaceable relative to the conveyor track in a direction of extension substantially transversely of the transport direction. This is because such a harvesting device has the advantage that the catcher and/or the harvesting bin can be extended particularly well alongside a plant and/or between branches of a bush. This advantage is achieved by driving the conveyor track in circular manner, so that the harvesting bin with the catcher thereon is displaced counter to the transport direction along at least a part of the conveyor track, i.e. in the harvesting segment. By driving the conveyor track at roughly the same speed as the harvesting device the harvesting bin does not move relative to the plant, or hardly so, while the harvesting bin is in the harvesting segment. By now displacing the catcher and/or the harvesting bin in the direction of extension relative to the conveyor track precisely in this harvesting segment a displacement of the catcher and/or the harvesting bin perpendicularly of the transport direction is brought about, without the catcher and/or the harvesting bin moving relative to the plant in the transport direction. In this way the catcher and/or the harvesting bin can be extended well alongside a plant or between branches, and a good connection to the plant can be achieved for the purpose of catching a relatively large amount of fruit. When the catcher is displaced, the catching element optionally attached thereto can also be displaced.

The displacement of the at least one catcher and/or the at least one harvesting bin can particularly be a lateral displacement of the at least one catcher and/or the at least one harvesting bin relative to the conveyor track, i.e. relative to a local part of the conveyor track on which the at least one catcher and/or the at least one harvesting bin is mounted. Said displacement is for instance a displacement away from and/or toward the conveyor track, whereby the distance between the at least one catcher and/or the at least one harvesting bin and the part of the conveyor track on which the catcher and/or the at least one harvesting bin is mounted changes.

The displacement of the catcher and/or the harvesting bin can for instance be achieved by making the at least one harvesting bin and/or the at least one catcher reciprocally displaceable over a carrier mounted on the conveyor track. The carrier can provide for a guiding in the displacement direction in relatively simple manner, while displacement in the other directions is prevented or limited.

The carrier is preferably mounted non-rotatably on the conveyor track and extends substantially transversely of a local longitudinal direction of the conveyor track, and encloses a second angle with an extension of the plane in which the conveyor track lies. Because the carrier is connected non-rotatably to the conveyor track at a second angle, the displacement of the catcher and/or the harvesting bin relative to the conveyor track can take place at least partially outside of the plane in which the conveyor track lies. This has the advantage that the catcher and/or the harvesting bin can be moved away from the conveyor track without coming to lie even closer to the ground here. This prevents the catcher and/or the harvesting bin from becoming jammed on the ground. The longitudinal direction of the carrier can here also define a longitudinal direction of the catcher, particularly of an arm thereof. Due to the second angle, the longitudinal direction of the arm of the catcher can thus be disposed less vertically than said plane, whereby fruit rolls less easily off the catcher.

It is advantageous for the second angle to be greater than the first angle, because the carrier hereby also extends upward from the conveyor track. The catcher and/or the harvesting bin is hereby moved toward the plant from below relative to the conveyor track, whereby a good enclosure of the plant results. In addition, the catcher, or at least an arm thereof, is directed upward away from the conveyor track owing to the greater second angle, whereby fruit falling onto the catcher is guided to the conveyor track. There, it can for instance be caught by the harvesting bin. The greater second angle thus ensures that fruit does not make its way to the free end of the catcher, or does so to lesser extent, where it could fall onto the ground.

The fact that the carrier is connected non-rotatably to the conveyor track further also provides the advantage that, when the carrier travels a round along the conveyor track, an angle between the longitudinal direction of the carrier and the horizon varies from the first angle, i.e. the angle of the plane in which the conveyor track lies with the horizon. Effectively, the non-rotatability in combination with the first angle thus results in a tilting effect on the carrier, and so on the harvesting bin. This tilting effect can be used to prevent fruit falling from the harvesting bin at an undesired moment by directing the harvesting bin upward. The second angle and the first angle are preferably chosen such that the carrier extends substantially vertically when it moves along an upper side of the conveyor track. This can or instance be achieved by making a sum of the second angle and the first angle roughly equal to 90°.

The displacement of the catcher and/or the harvesting bin is achieved particularly in that the conveyor track has a substantially linear harvesting segment extending substantially in the transport direction along a lower side thereof, and the harvesting device further comprises a first guide placed along the harvesting segment for the purpose of displacing the at least one harvesting bin and/or the at least one catcher in the direction of extension relative to the conveyor track, wherein the first guide is configured, while the harvesting bin and/or the catcher is being displaced along the harvesting segment counter to the transport direction by the conveyor track, to first move the harvesting bin and/or the catcher away from the conveyor track in the direction of extension, hold it away from the conveyor track while the harvesting bin is being displaced along at least a portion of the harvesting segment, and then displace it back toward the conveyor track counter to the direction of extension. Such a guiding provides not only the above described advantages in respect of extending the catcher alongside the plant or between branches, but also for displacing the catcher and/or the harvesting bin in the direction of extension without rotating them. This has the advantage that the catcher and/or the harvesting bin are moved straight toward a plant, whereby a particularly good enclosure of the plant can be achieved.

The carrier can further comprise a stop for the harvesting bin, which is configured to close the harvesting bin at least partially when the harvesting bin lies against the stop. A closure of the harvesting bin can hereby be provided in relatively simple manner. The stop is particularly advantageous when the carrier is directed upward from the conveyor track, because the force of gravity then urges the harvesting bin toward the conveyor track. The force of gravity thereby has a pulling-back effect on the harvesting bin. When the stop is arranged in the vicinity of the conveyor track, the force of gravity also provides for a closing action by urging the harvesting bin toward the stop, whereby the harvesting bin closes itself against the stop. Instead of letting the force of gravity urge the harvesting bin toward the stop, the harvesting device can also be provided with means for urging the harvesting bin toward the stop. These means can for instance be formed by a guide along the conveyor track which engages on a protrusion of the harvesting bin.

For the purpose of unloading the fruit from a harvesting bin, the conveyor track can further have an unloading segment along an upper side thereof, wherein the harvesting device further comprises a second guide placed along the unloading segment for the purpose of opening the at least one harvesting bin at least partially by moving it away from the stop. As explained above, the position of the unloading segment on the upper side of the conveyor track ensures that collecting means can be provided under the unloading segment. The guide can provide in simple manner for the harvesting bin being opened at a determined position, whereby the fruit falls from the harvesting bin. The fruit can then finally be caught under the harvesting bin by the collecting means.

For collecting fruit the harvesting device can further comprise a crate transport system configured to pass collecting crates under the unloading segment in or counter to the transport direction for the purpose of catching fruit from the at least one harvesting bin in the collecting crates. The fruit from one or more harvesting bins is in this way easily collected in a collecting crate, which can then be stored temporarily before the fruit is processed further.

The crate transport system preferably comprises a buffer for one or more stacks of crates, a de-stacker connected to the buffer, a filling track lying under the unloading segment and connecting to the de-stacker, and a stacker connecting to the filling track. Such a crate transport system can store both a plurality of empty crates and a plurality of crates filled with fruit, while empty crates are filled with fruit during the harvesting. A harvesting device with such a crate transport system thereby provides the advantage that harvesting can continue for some time without crates having to be moved from or to the harvesting device. It is particularly advantageous here for the stacker also to be connected to the buffer, on a side thereof lying opposite the de-stacker. Empty crates can thereby be taken from the buffer on a first side by the de-stacker, and on the other side the buffer can be filled with filled crates by the stacker. The buffer is thereby used both for empty and by full crates, whereby efficient use is made of space on board the harvesting device. It goes without saying that when all the empty crates have been taken from the buffer and it is filled only with crates filled with fruit, the fruit must be removed from the crates or new crates must be supplied in order to be able to keep harvesting.

In an embodiment of the harvesting device a running speed of the conveyor track is synchronized with a displacement speed of the harvesting device. As already described above, the conveyor track moves counter to the transport direction along its underside. Due to the synchronization of the displacement speed and the running speed, the at least one catcher and/or harvesting bin is stationary in the transport direction relative to a plant whose fruit is being harvested. This prevents damage to the plant and enhances the enclosing of the plant by the harvesting bin or a catcher arranged thereon. The running speed and the displacement speed are in particular roughly the same, and have opposite directions along at least a part of the conveyor track. This part of the conveyor track forms the harvesting segment and therefore preferably lies on an underside of the conveyor track.

The synchronization can for instance be achieved by a motor which is placed on the frame and is connected drivingly to both the conveyor track and a first chassis carrying the frame. That is, by using the motor for both the chassis and the conveyor track no or hardly any relative difference in speed can result.

In a practical embodiment of the harvesting device according to the invention the conveyor track comprises a chain. A chain is particularly advantageous because rotation thereof in its longitudinal direction can be prevented, and the chain can withstand a sufficiently great tension. A double chain can be used to be able to withstand even more rotation and tension.

It is advantageous for the harvesting device to be provided with two substantially identical conveyor tracks with harvesting bins connected thereto, wherein the conveyor tracks are removed from each other in a horizontal direction transversely of the transport direction and are driveable in circular manner in opposite direction. A harvesting space is thereby created between the two conveyor tracks. By maneuvering the harvesting device relative to the plants such that they as it were move through the harvesting space the plants can be approached by the catchers and the harvesting bins of the two conveyor tracks from two sides at the same time. The plants can hereby be enclosed more effectively, and a greater proportion of the fruit can thus be harvested.

The two conveyor tracks preferably each lie on a side of a gantry which is formed by the frame and is displaceable over a row of plants. The gantry can have two frame halves which are connected to each other with a bridge piece. Owing to the form of the gantry, the plants can be approached from two sides.

It is practical to drive each conveyor track synchronously with a part of the first chassis lying on its side of the frame, but to make the parts of the frame lying opposite each other driveable independently of each other to at least a determined degree. A rotation of the harvesting device about a vertical axis can hereby be achieved by temporarily driving one side of the frame faster than the other, whereby the harvesting device can be aligned with for instance a row of plants. This is for instance necessary to compensate for deviations which result for instance when one side of the harvesting device slips on the ground and thereby lags behind the other side, or when the row of plants is not precisely straight.

It is moreover particularly advantageous for each conveyor track to have its own crate transport system. The crate transport systems can hereby take a relatively simple form because they need no longer co-act. Each crate transport system is therefore particularly disposed in the longitudinal direction of the harvesting device, i.e. parallel to the transport direction.

When the buffer, the de-stacker, the filling track and the stacker lie substantially in the same vertical plane parallel to the transport direction, a relatively narrow crate transport system is obtained. The frame halves of the harvesting machine can hereby be advanced between adjacent rows of plants in simple manner.

The harvesting device is preferably provided with at least one platform which is mounted on the frame and is configured to carry workers. Because the workers can stand on the platform, they need not walk along with the harvesting device themselves. This can accelerate and/or facilitate the harvesting. The platform further contributes to the safety of the workers, since workers walking back and forth close to the harvesting device, particularly when the harvesting device is being driven, can result in accidents and is no longer necessary as much or at all owing to the platform.

The at least one platform is preferably placed within the periphery of the at least one conveyor track. The workers can hereby easily reach plants which, after all, pass the conveyor track when the harvesting device moves over a row of plants. The workers can thereby shake the plants without additional aids such as shaking sticks, which makes their work easier. In addition, it is not or hardly necessary for the workers to bend over for the shaking, which results in good working conditions for them. This arrangement moreover contributes to the space within the frame being optimally utilized, and the frame thus being able to take a compact form, with relatively narrow frame halves.

The harvesting device can also be provided with shaking means for shaking plants for harvesting. When such shaking means are provided, the platform can be dispensed with, since no place is needed for the workers.

The harvesting device particularly has displacing means for displacing the harvesting device transversely of the transport direction. When the fruit has been harvested from a first row of plants by displacing the frame thereover in the transport direction, the harvesting device can thereby be displaced to a second row of plants in order also to harvest the fruit from the second row of plants.

For this purpose the displacing means preferably comprise a collapsible and extendable second chassis. By extending the chassis the harvesting device can be displaced transversely of the transport direction, while by collapsing the chassis it can be guaranteed that the harvesting device is displaced substantially only in the transport direction. This latter is advantageous during harvesting of a row of plants, because (adjusting the) steering of the harvesting device during harvesting of a row of plants is thereby not necessary.

The frame is here preferably carried by the first chassis, wherein the harvesting device is further provided with lifting means for lifting and lowering the frame relative to the first chassis or second chassis. It is hereby possible to switch from displacement in the transport direction to displacement transversely of the transport direction by:

lifting the frame relative to the first chassis;
extending the second chassis; and
lowering the frame relative to the first chassis, whereby the frame comes to rest on only the second chassis.

In this final step the first chassis is effectively lifted off the ground. In order to switch from displacement transversely of the transport direction to displacement in the transport direction the above stated steps are performed in reverse direction and order.

It is of course also possible to envisage the first chassis taking a steerable form, whereby the harvesting device can likewise be displaced transversely of the transport direction. The chassis could for instance be provided with wheels which can be swivelled through an angle of 90° about a vertical axis.

The harvesting device further preferably has a tarpaulin tensioned above the at least one harvesting bin at an angle to the horizon for the purpose of catching fruit out of reach of the at least one harvesting bin and guiding it to the at least one harvesting bin. Such a tarpaulin can increase the reach within which fruit can be caught. In addition, a tarpaulin has the feature advantageous to fragile fruit that it has a somewhat resilient effect, whereby the fruit has a relatively soft landing when it falls onto the tarpaulin.

A ribbon is preferably tensioned along the tarpaulin for the purpose of slowing down fruit caught by the tarpaulin. It is particularly when the tarpaulin is large that the speed at which fruit is guided by the tarpaulin to the harvesting bin can be relatively high. By slowing down the fruit using the ribbon, which is tensioned close to the underside of the tarpaulin and has a somewhat resilient effect, the fruit will eventually come to lie in the harvesting bin at a lower speed, which minimizes the chance of damage.

It is further also advantageous for the harvesting device also to be displaceable counter to the transport direction; and for the at least one conveyor track to be driveable in circular manner in two directions. This is because the harvesting device can hereby operate in two directions, so that the harvesting device is thus bi-directional. This has the advantage that, when it has finished harvesting one row of plants, the harvesting device need not be turned in order to also harvest a different row of plants, nor does it need to be moved back over the one row. This provides the advantage that harvesting of the second row can commence more quickly, and that less space is required for turning the harvesting device. The space saved hereby can for instance be used to place more plants in the rows, which increases the harvest per unit of land area.

The skilled person will appreciate that when the harvesting device is displaceable in two opposite directions, the transport direction as indicated in the present application is always the one in which the harvesting device is actually being displaced during use. When the harvesting device is thus displaced in the opposite direction at a later time, the transport direction also changes.

The invention further relates to a method for harvesting fruit hanging from a plant, comprising the steps of displacing a harvesting device as described above toward a plant in a transport direction and driving the at least one conveyor track in circular manner, and thereby displacing the at least one harvesting bin to a first position lying close to an underside of the plant, and holding the at least one harvesting bin in the first position at the same time as shaking the plant so that fruit therefrom falls into the at least one harvesting bin or at the same time as picking and dropping fruit so that it falls into the at least one harvesting bin, and displacing the at least one harvesting bin to a second position, in which the at least one harvesting bin is removed further from the plant than in the first position and lies higher than in the first position, and emptying the at least one harvesting bin in the second position.

Such a method can use the above described harvesting device with any combination of above described features, and can thereby provide the advantages associated therewith.

The invention is further elucidated with reference to the accompanying figures, wherein:

FIG. 5A shows schematically a top view of the harvesting device of FIGS. 1-4 with crate transport systems made transparent, and FIG. 5B an enlargement of a part thereof;

The same elements are designated in the figures with the same reference numerals. Corresponding elements in different embodiments are designated with reference numerals differing from each other by a hundred (100).

Figure 1:
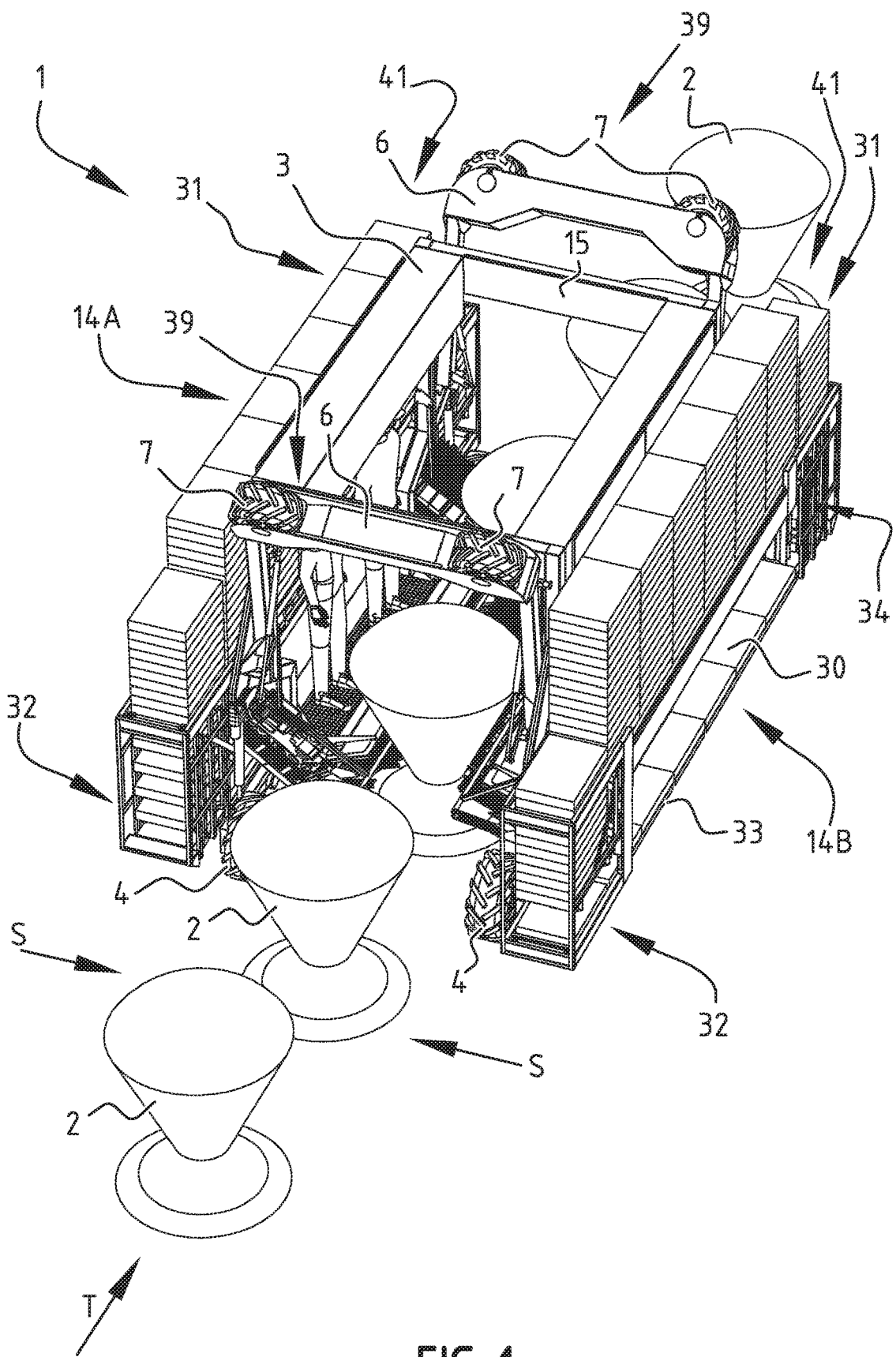
FIG. 1 shows schematically a perspective view of a harvesting device according to the invention during operation, while it is being displaced along a row of plants.

The figures show a harvesting device 1 which is used for harvesting fruit hanging from a plant 2. In this case plants 2 are shown greatly simplified. Plants 2 can for instance be bushes 2, which consist of a plurality of branches extending upward from the ground. Plants 2 are generally in a row so as to facilitate the harvesting, but are not always precisely in a straight line. The deviation of plants 2 relative to a precisely straight line comes about randomly during planting and/or growing of plants 2 and impedes harvesting, as will be further elucidated below. Hanging from plants 2 is fruit (not shown) which comes off plant 2 when the plant 2 is shaken. The fruit then falls onto the ground, unless it is caught. Fruit which falls on the ground is deemed lost, thus making it important to catch as much fruit as possible in order to be able to use as much of the harvest as possible. Instead of shaking plants 2, it is also possible to envisage picking fruit from plants 2 and then dropping it. As in the shaking of plants 2, the fruit will hereby fall in the vicinity of the plant. It is thus possible, where this application relates to the shaking of plants 2 in order to cause fruit to fall, to instead envisage picking fruit and dropping it.

In order to harvest fruit from such plants 2 a harvesting device 1 is provided, which has a frame 3 which is displaceable in a transport direction T. Transport direction T is the same as the longitudinal direction of the row in which plants 2 are arranged. In this embodiment frame 3 can travel in that it is provided with wheels 4. Wheels 4 form part of a first chassis 5, which carries frame 3. In order to be able to approach plants 2 from two sides frame 3 is formed as a gantry which can be displaced over the row of plants 2. The gantry comprises two frame halves 14A, 14B connected on their upper side by a bridge piece 15. During harvesting the harvesting device 1 is thus displaced over the row of plants in the longitudinal direction of the row of plants 2, i.e. in the transport direction T.

Figure 3:
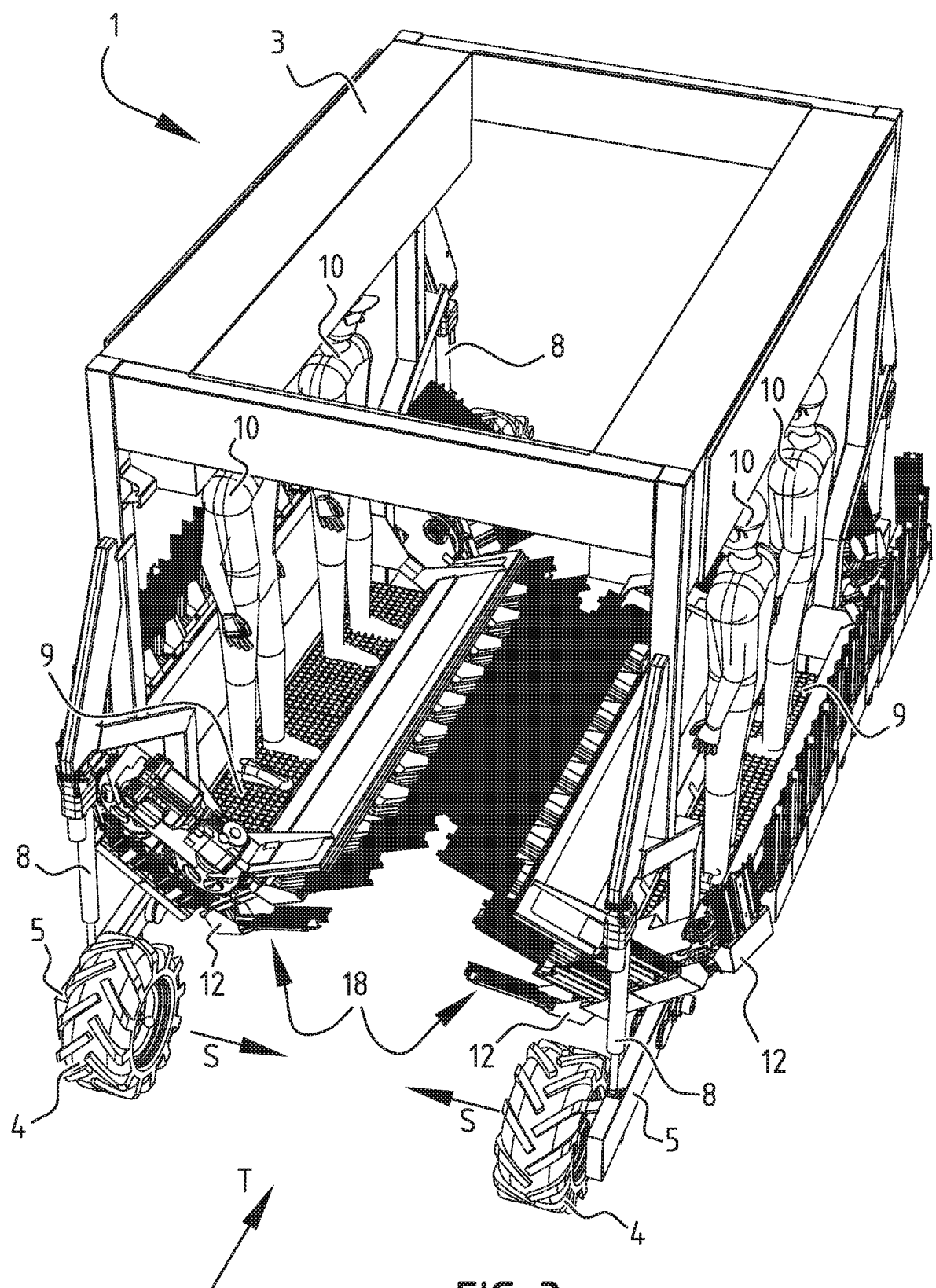
FIG. 3 shows schematically yet another perspective view of the harvesting device of FIGS. 1 and 2, wherein crate transport systems on either side of the harvesting device and the plants are not shown for the sake of clarity.

Harvesting device 1 also has displacing means 39 for displacing the harvesting device in a direction transversely of the transport direction. This transverse direction is also referred to as the direction of extension S and, just as the transport direction T, lies substantially in a horizontal plane. In the shown embodiment displacing means 39 comprise a collapsible and extendable second chassis 6 which carries wheels 7. In FIG. 3 the second chassis 6 is not shown in order to enable other parts of harvesting device 1 to be shown more clearly.

Figure 2:
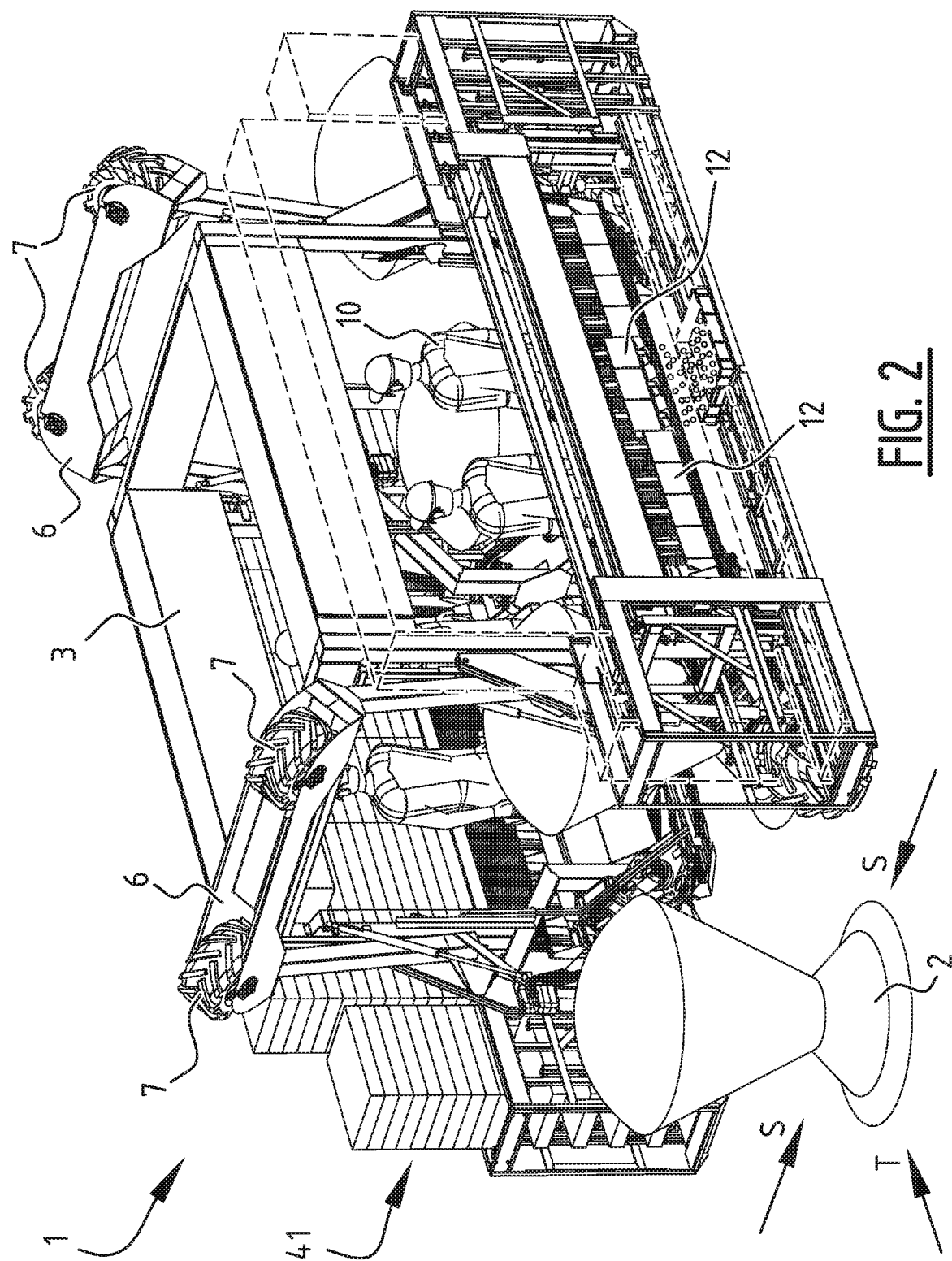
FIG. 2 shows schematically another perspective view of the harvesting device of FIG. 1, wherein collecting crates on a side of the harvesting device are shown transparently.

In FIGS. 1 and 2 the second chassis 6 is shown directed upward, i.e. in a collapsed position. In order to be able to move in the direction of extension S the second chassis 6 can be extended by moving wheels 7 thereof downward and placing them on the ground G. Second chassis 6 is connected by means of lifting means 8 (see FIG. 3) to the frame. Lifting means 8 can be used to lift or lower frame 3 relative to first chassis 5. Frame 3 can thereby be lifted in effective manner so as to extend the second chassis 6 onto the ground G, after which frame 3 can be lowered and first chassis 5 lifted, so that frame 3 supports exclusively on second chassis 6. The same can be carried out in reverse and in opposite direction to once again make frame 3 able to travel in transport direction T.

Mounted on each half 14A, 14B of frame 3 is a platform 9 on which workers 10 can stand. From there, workers 10 can easily reach plants 2 in order to shake them, whereby the fruit on plants 2 drops down. In order to catch the falling fruit harvesting device 1 has a conveyor track 11, carried by frame 3, which can be driven in circular manner. Conveyor track 11 will be described further below with reference to FIGS. 4 and 5. Harvesting bins 12 with catchers 18 are mounted on the conveyor track for the purpose of catching fruit.

Figure 4:
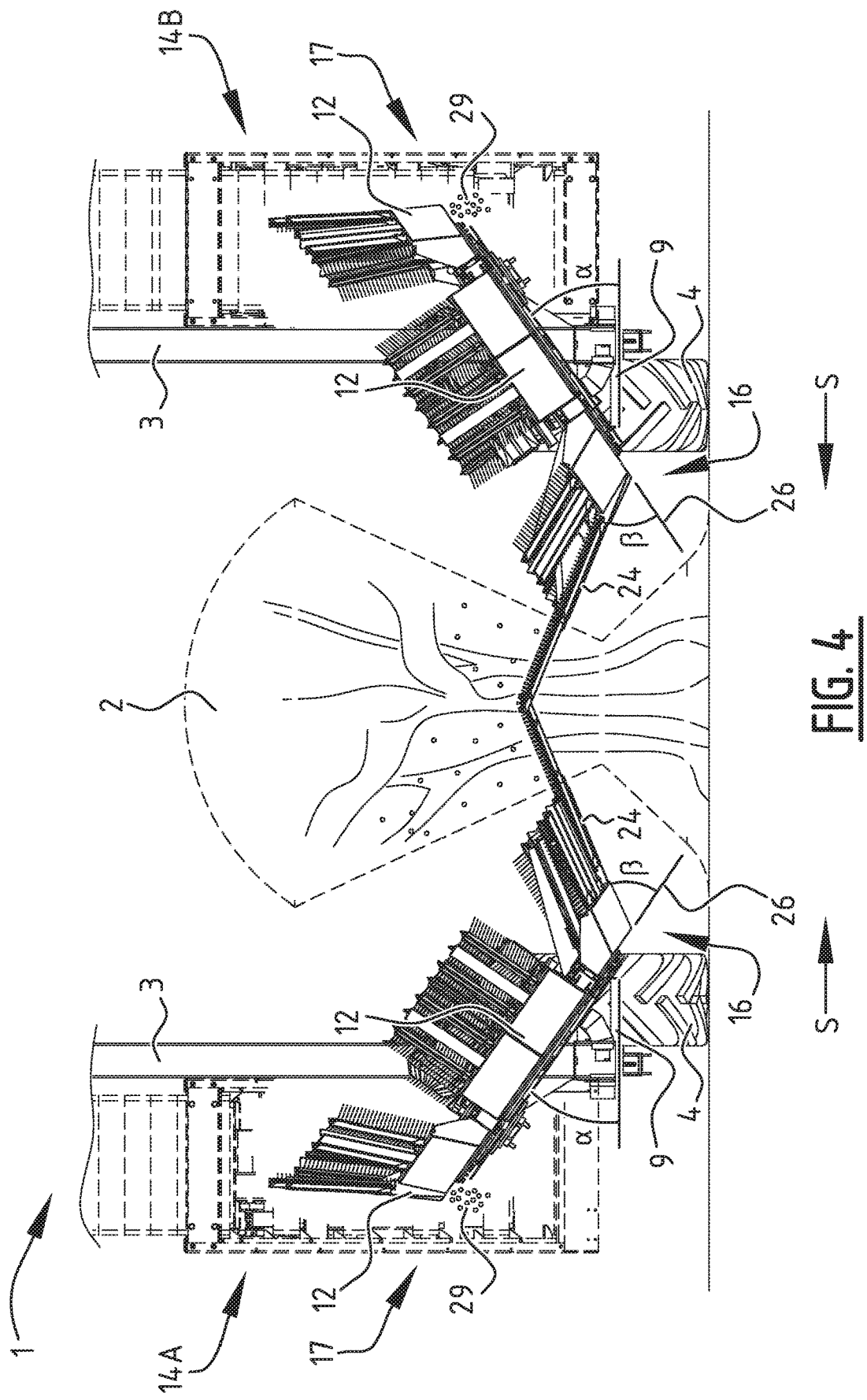
FIG. 4 shows schematically a front view of the harvesting device of FIGS. 1-3 transversely of the transport direction, wherein a part of a chassis has been dispensed with and the crate transport systems have been made transparent.

The top view of FIG. 5A shows that harvesting device 1 has two conveyor tracks 11, one on each side 14A, 14B of its frame 3. Conveyor tracks 11 are shown as bold black lines, but in practice can be formed by a chain 11. The chain 11 runs around toothed wheels 13. FIG. 4 shows that a plane in which each conveyor track 11 lies forms a first angle α with the horizon. The plane further runs parallel to transport direction T, which in FIG. 4 runs into the figure. Owing to the first angle α, each conveyor track 11 has a first side 16 which is situated relatively close to the ground, and a second side 17 lying opposite the first side and situated further from the ground. First side 16 is directed toward plants 2 during use. Because this first side 16 is situated relatively close to the ground, harvesting bins situated on this first side 16 of conveyor track 11 can also approach a plant 2 for harvesting relatively close to the ground. Plants 2 are there generally narrower, and can be better enclosed by catchers 18, which are described further below. The second side 17 lies at a greater distance from the ground G. Harvesting bins 12 which have been displaced away from the plants and to this second side 17 along conveyor track 11 are therefore situated higher. Fruit can thereby be easily removed or unloaded from harvesting bins 12.

The harvesting bins 12 shown in FIGS. 1-5 in this case each have two catchers 18 in the form of a brush which is formed by an arm 19 with bristles 20. A catcher 18 is shown in detail in FIG. 6. This shows two arms 19 extending from harvesting bin 12 and each provided with bristles 20. The bristles 20 form for each arm 19 a gutter which can catch fruit and guide it to harvesting bin 12. Such a brush can be utilized effectively when plants 2 of which the fruit has to be harvested are bushes, since arms 19 of the brushes can be extended between branches of the bush, whereby the bristles 20 will enclose the branches and form an at least almost uninterrupted catching surface for fruit falling off plant 2. It is however also possible to give the catchers a different form, for instance that of the alternatives shown in FIGS. 7B-7C.

Figure 7A:
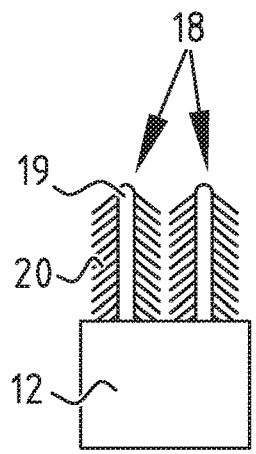
FIG. 7A shows highly schematically a top view of the harvesting bin with catcher of FIG. 6, and FIGS. 7B and 7C once again show highly schematic top views of alternatives for the harvesting bin with catcher of FIG. 7A.
Figure 7B:
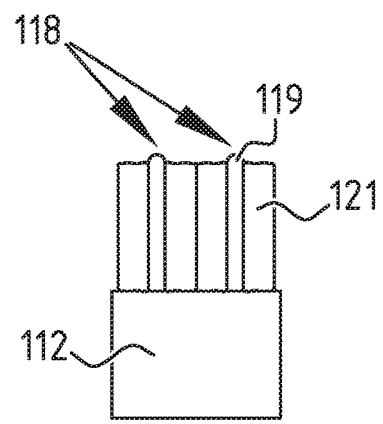
FIGS. 7D and 7C show highly schematic top views of conveyor tracks with harvesting bins and catchers according to two different embodiments of the harvesting device.
Figure 7C:
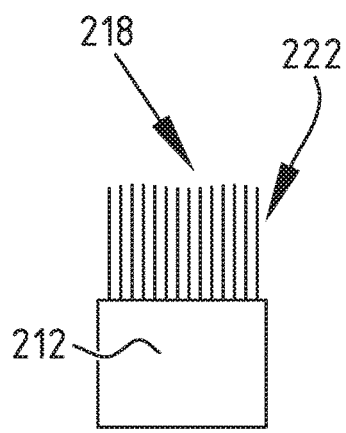

FIG. 7A shows the catcher 18 and the harvesting bin 12 as described above, and is therefore not further elucidated. FIG. 7B shows a harvesting bin 112 with catcher 118 which can be used as alternative to the harvesting bin 12 and catcher 18 of FIG. 7A. Harvesting bin 112 does not differ from the above stated harvesting bin, and is therefore not further described. Catcher 118 is however different in that, although it comprises an arm 119, it comprises no bristles. Instead, a flexible strip 121 extending sideways from arm 119 is provided. Just as bristles 20, flexible strip 121 serves to enclose plants or branches thereof so as to form a catching surface for fruit. FIG. 7C shows another alternative to the catchers 18, 118 of FIGS. 7A and 7B, which differs from the previously shown catchers 18, 118 in that catcher 218 of FIG. 7C is formed only by a number of bristles 222 extending directly from harvesting bin 212. During harvesting, such bristles 222 are extended between the branches of plants 2 and thus form a catching surface for fruit. Although two catchers 18, 118 are in each case shown per harvesting bin 12, 112 in the figures, it is also possible to provide harvesting bins 12, 112 with one or with more than two catchers 18, 118.

Figure 7D:
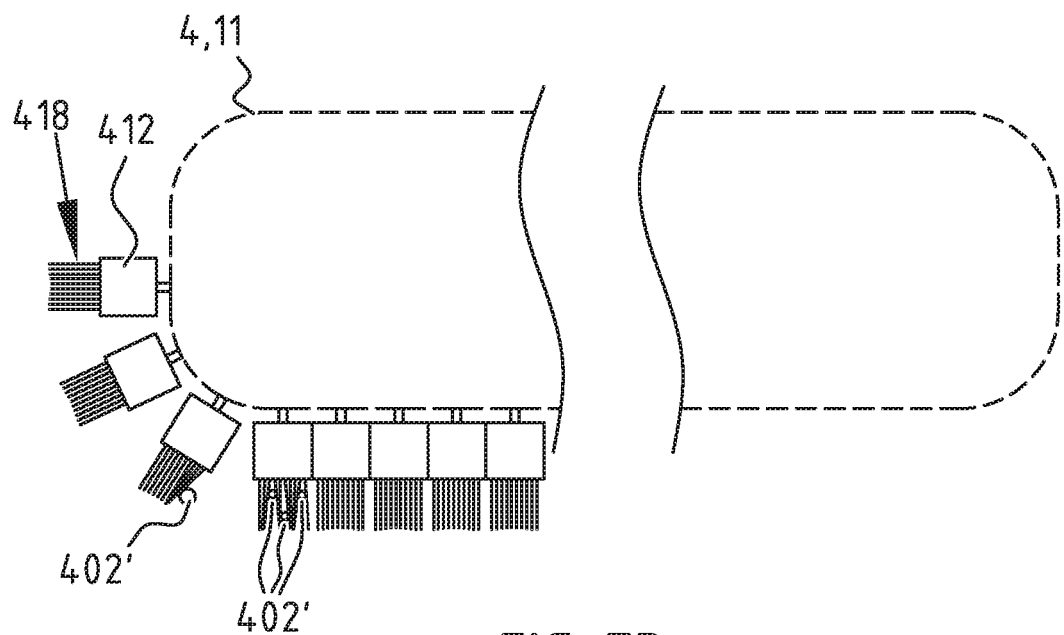
Figure 7E:
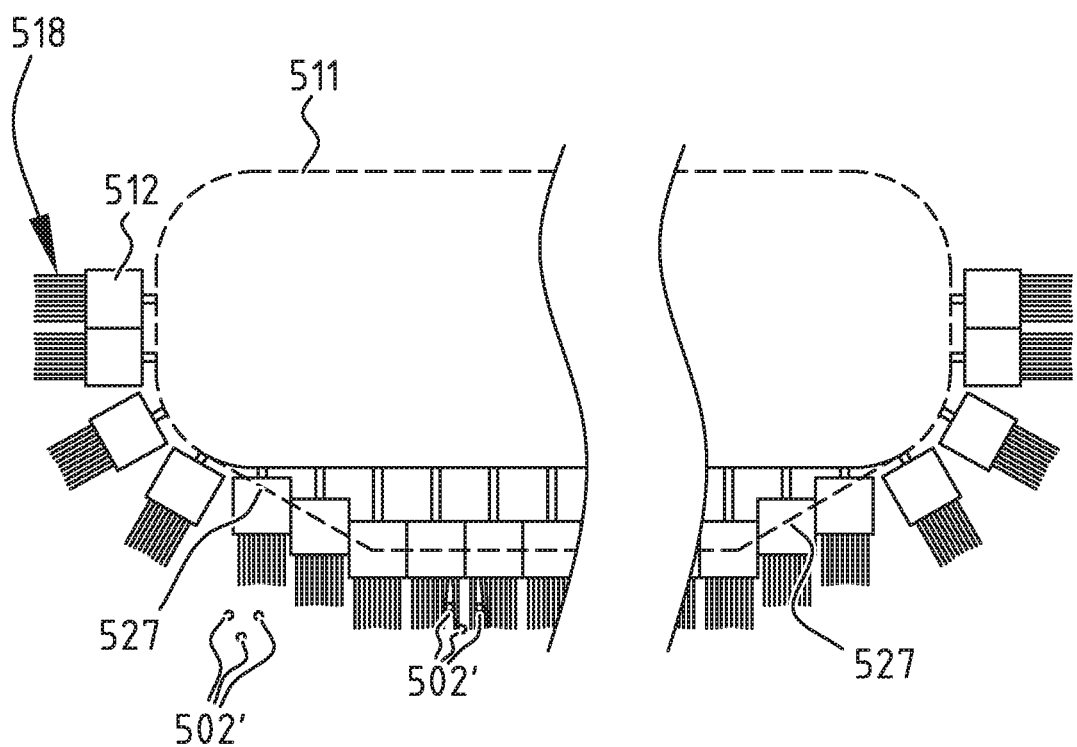

For the sake of completion, catchers 218 of FIG. 7C are shown again in a highly schematic top view with a conveyor track 411, 511 in FIGS. 7D and 7E. FIG. 7D shows that catchers 418 are mounted on the circular conveyor track 411 and, owing to the circulation thereof in the direction indicated with arrow O, are extended between branches 402' of plants with a swiping motion. A similar situation is drawn in FIG. 7E, but a first guide 527 is here also provided, whereby catchers 518 are extended between the branches 502' of a plant with an extending motion. First guide 527 is similar to the first guide 27 which will be described below. The embodiments of FIGS. 7D and 7E can be applied in a harvesting device as described above and further below.

Irrespective of whether a catcher 18, 118, 218 is used and, if so, what type of catcher 18, 118, 218 is used, harvesting device 1 is provided, as can be seen most clearly in FIG. 5A, with a plurality of harvesting bins 12, 112, 212 and thus also with a plurality of catchers 18, 118, 218 which connect to each other along a portion of conveyor track 11. This results along this portion of the conveyor track in a catching surface 23 of a plurality of harvesting bins 12 and catchers 18 for catching fruit.

In FIG. 5B, which shows an enlargement of a part of FIG. 5A, three harvesting bins 12 connected to conveyor track 11 are designated with 12-1, 12-2 and 12-3. When conveyor track 11 is driven, harvesting bins 12-1, 12-2 and 12-3 move counter to the transport direction. In this case the harvesting bins 12-1, 12-2 and 12-3 are displaceable relative to conveyor track 11 in a direction of extension S which runs transversely of the transport direction T. Harvesting bins 12-1, 12-2, 12-3 can hereby be moved in their longitudinal direction toward a plant 2 while moving along the conveyor track. This can be seen from harvesting bin 12-1, which has been displaced further in the direction of extension S than harvesting bin 12-2, which in turn has been displaced further in the direction of extension than harvesting bin 12-3. It is also possible to envisage displacing only the catcher 18, instead of the harvesting bin 12, relative to conveyor track 11, in both cases the advantage results that harvesting bin 12 and/or catcher 18 can be moved toward the plant. Harvesting bins 12-1, 12-2, 12-3 can of course be retracted again on another side (not shown in FIG. 5B) of the same conveyor track 11.

Figure 6:
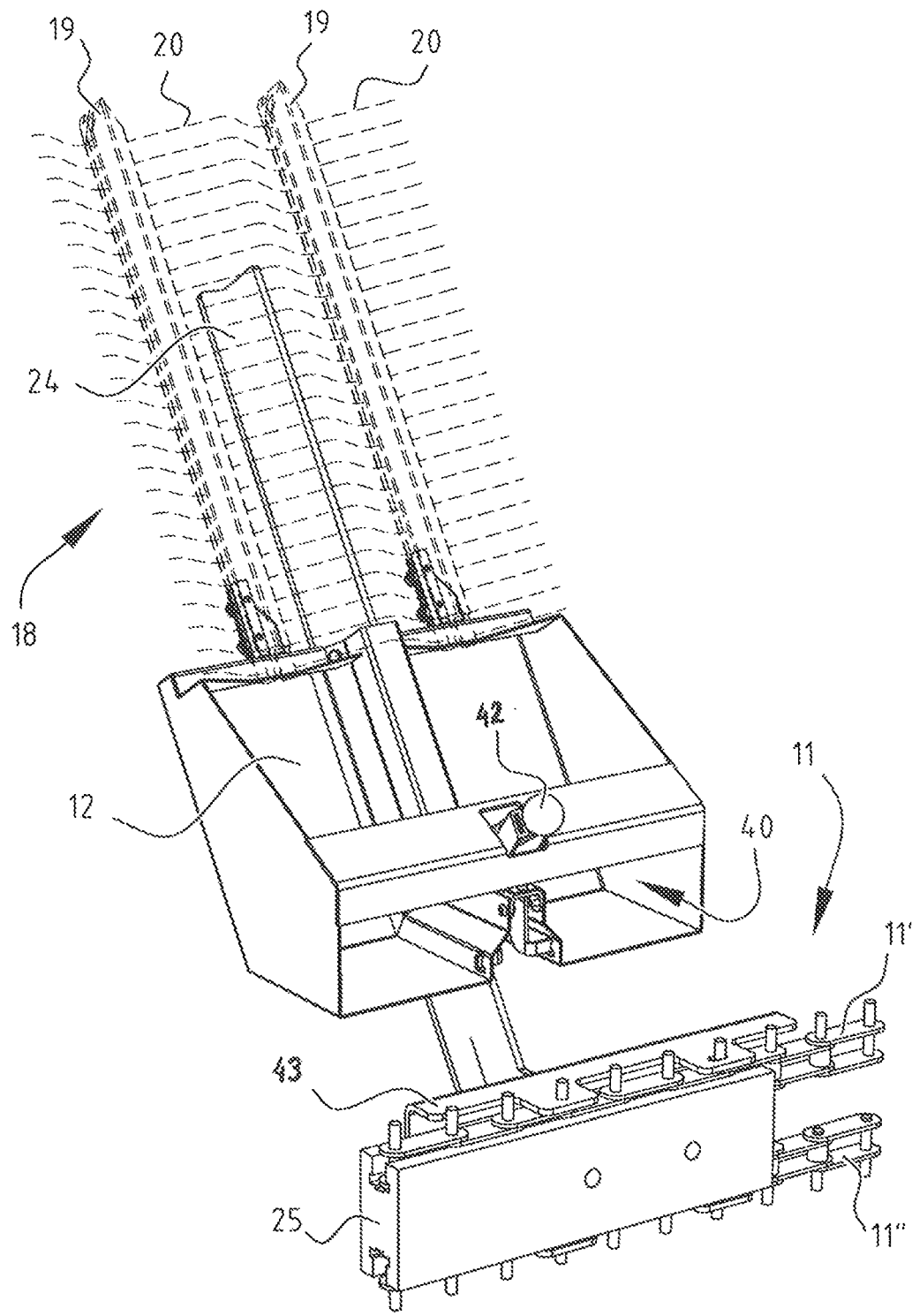
FIG. 6 shows schematically a perspective view of a harvesting bin with a catcher of the harvesting device of FIGS. 1-5.

FIG. 6 shows that harvesting bin 12 is displaceable relative to conveyor track 11 over a carrier 24. The carrier 24 is mounted on conveyor track 11 and functions as a rail for the harvesting bin 12. In the case that only the catcher 18 is displaceable relative to conveyor track 11, it can move over the carrier 24. In this shown embodiment carrier 24 is connected non-rotatably to conveyor track 11. In order to be able to properly withstand rotational forces conveyor track 11 comprises here a double chain which is formed by a first chain 11' and a second chain 11". The double chain runs through a chain guide 25 which holds the two chains 11', 11" in place. As can be seen most clearly in FIG. 4, carriers 24 enclose a second angle β with an extension 26 of the plane in which conveyor track 11 lies. Because the second angle β is in this case greater than the first angle α, carriers 24 situated on the underside 16 of conveyor track 11, and thereby catchers 18 and harvesting bins 12, extend upward at the angle difference β−α. The fruit caught by catchers 18 is thereby guided to the harvesting bins 12 under the influence of the force of gravity. The second angle β further ensures that the catchers 18 and/or harvesting bins 12 can be displaced toward plants 2 on the underside 16 of conveyor track 11.

Because carriers 24 are connected non-rotatably to conveyor track 11 and the conveyor track 11 forms the first angle α with the horizon, carriers 24, and thereby harvesting bins 12 and catchers 18, tilt when they travel a round along conveyor track 11. In particular, the carriers 24 on the upper side 17 of conveyor track 11 are directed substantially vertically upward in that the first and second angle α, β together cover about 90°. Harvesting bins 12 are hereby urged toward conveyor track 11 by the force of gravity and an opening in harvesting bins 12 is directed upward, whereby fruit does not fall from harvesting bins 12. In order to close harvesting bins 12 effectively the carrier 24 has a stop 43 for harvesting bin 12. Stop 43 is arranged close to conveyor track 11 and also functions as a lid or cover, whereby an open upper side 40 of harvesting bin 12 is closed when harvesting bin 12 drops toward conveyor track 11 under the influence of the force of gravity.

In order to bring about the displacement of harvesting bins 12 relative to conveyor track 11 in the direction of extension S harvesting device 1 further comprises a first guide 27 which is placed along a harvesting segment 16 (FIGS. 5A, 5B). Harvesting segment 16 is substantially linear and is situated along a lower side of conveyor track 11. First guide 27 engages on a protrusion 42 arranged on each harvesting bin 12 (FIG. 6). As seen in the running direction of conveyor track 11, first guide 27 first runs off from conveyor track 11 in direction of extension S. First guide 27 thereby displaces harvesting bins 12 away from conveyor track 11 via their protrusion 42. First guide 27 then extends parallel to conveyor track 11 over a determined distance, whereby the distance between harvesting bins 12 and conveyor track 11 remains the same over this determined distance. After this, first guide 27 runs back to conveyor track 11, so counter to direction of extension S, and displaces harvesting bins 12 back to the conveyor track.

Figure 8:
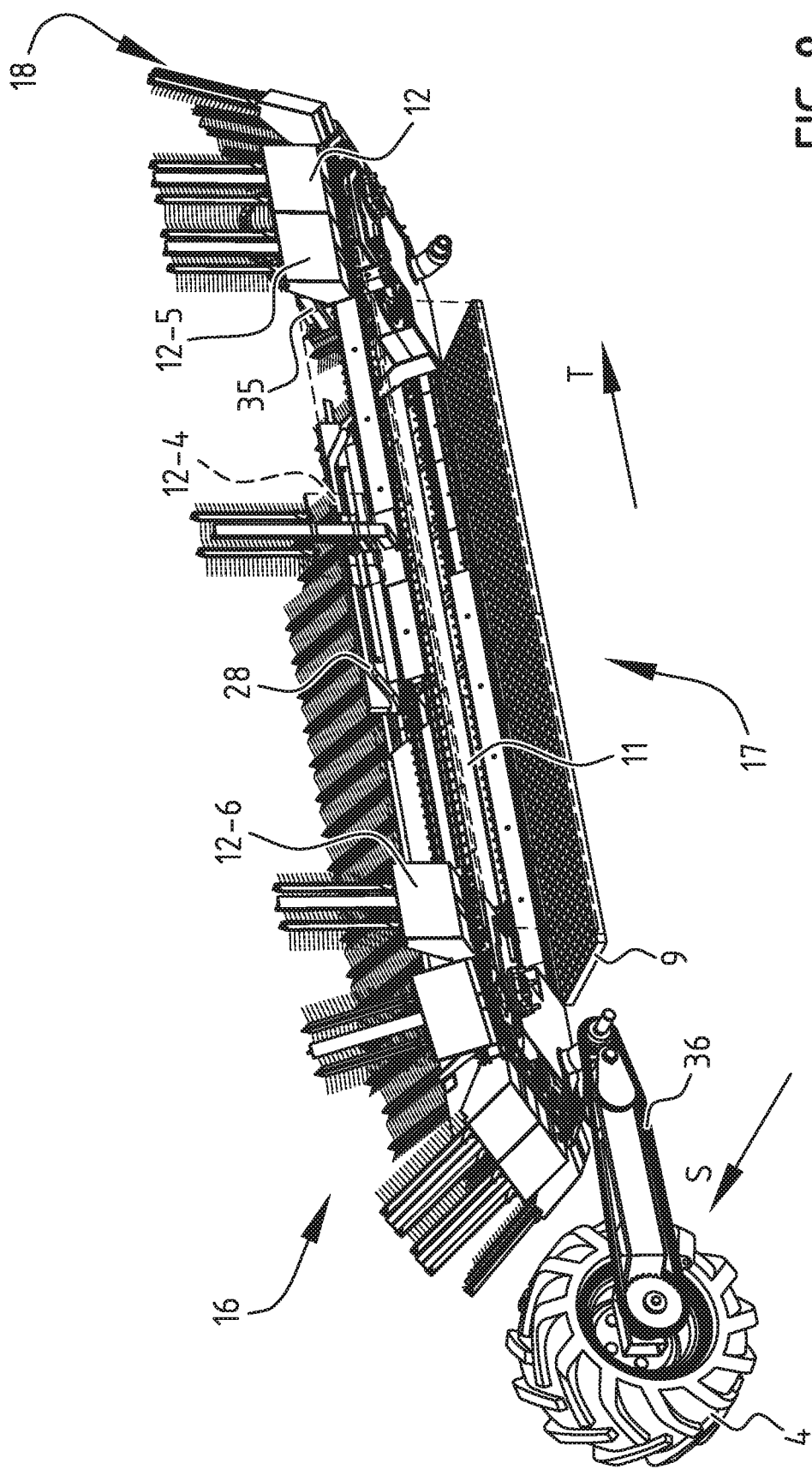
FIG. 8 shows schematically a perspective view of a conveyor track and nearby components of the harvesting device of FIGS. 1-6.

Harvesting device 1 further has a second guide 28 made visible in FIG. 8 by not showing a number of harvesting bins 12. Second guide 28 is placed along an unloading segment of conveyor track 11, which runs along an upper side 17 thereof. Second guide 28 urges harvesting bins away from conveyor track 11 temporarily in a similar manner as first guide 27. In FIG. 8 harvesting bin 12-4 has been moved away from conveyor track 11 by second guide 28, whereby it is no longer closed by its stop 43 functioning as lid. Because harvesting bin 12-4 is tilted substantially vertically on this upper side 17 of conveyor track 11, fruit present in harvesting bin 12-4 falls therefrom. As can be seen from closed harvesting bins 12-5 and 12-6, harvesting bins 12 remain closed by their stop 43 along the remaining part of the upper side 17 where second guide 28 is not located.

Figure 9:
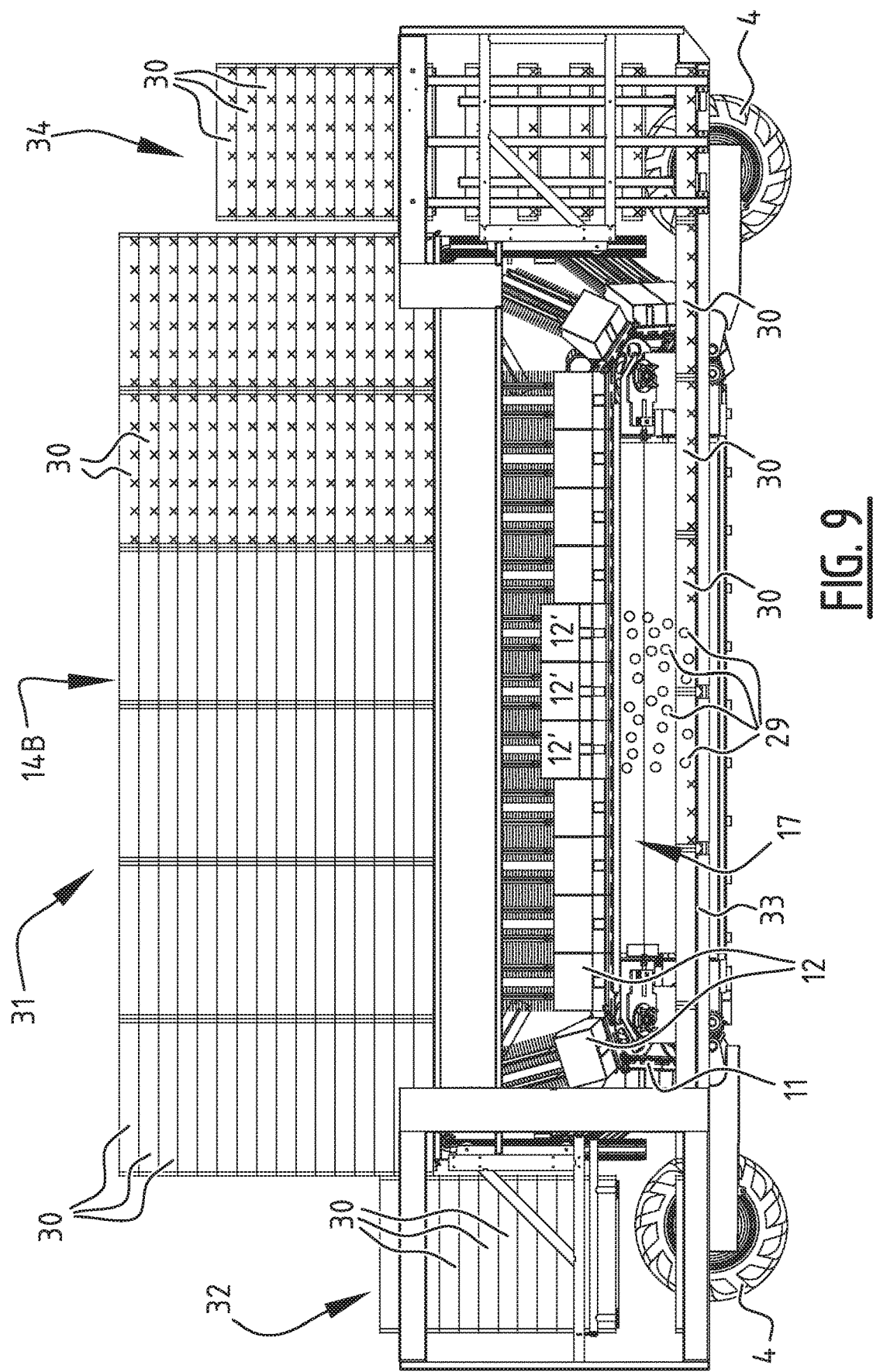
FIG. 9 shows schematically a side view of the harvesting device of FIGS. 1-6 and 8.

Mainly because of the height at which the harvesting bins 12 are situated during emptying, the fruit falling from harvesting bins 12 can easily be caught under the unloading segment of conveyor track 11. FIG. 9 shows the further processing of the fruit. The figure shows a side view of harvesting device 1, whereby the upper side 17 of conveyor track 11 is readily visible. Harvesting bins 12 are displaced along the upper side 17, with the unloading segment thus also situated there. A number of, in this embodiment three, harvesting bins 12' has been moved away from conveyor track 11 and from their stop 43 by second guide 28, and thereby opened. Fruit, in this case shown as berries 29, falls from the opened harvesting bins 12'. Harvesting device 1 has a crate transport system 41 which advances collecting crates 30 under the unloading segment over a filling track 33, in or counter to the transport direction T. Collecting crates 30 catch the berries 29 under the unloading segment, and are thus filled. Filled collecting crates 30 are indicated in FIG. 9 with crosses, while empty collecting crates have no crosses.

Yet another separating or cleaning system (not shown here) can otherwise be arranged between harvesting bins 12 in the unloading segment and the collecting crates 30 in filling track 33, in which system stems, leaves and other foreign bodies are removed from the fruit, for instance by means of airflow. Such a separating or cleaning system also bridges the distance between the unloading segment and filling track 33, whereby the fruit will land in collecting crates 30 less hard.

Crate transport system 41 has a buffer 31 for one or more stacks of collecting crates, a de-stacker 32 connected to buffer 31, a filling track 33 connecting to de-stacker 32 and lying under the unloading segment, and a stacker 34 connecting to filling track 33. De-stacker 32 takes collecting crates 30 from buffer 31 and carries them over filling track 33 so as to advance them under the unloading segment. At the end of filling track 33 filled collecting crates 30 are stacked by stacker 34 and added to buffer 31 again. When the stack of collecting crates 30 in de-stacker 32 has dropped to a level below an underside of buffer 31, crate transport system 41 ensures that the whole content of buffer 31 is displaced by a crate length. A new stack of empty collecting crates 30 then comes to lie on de-stacker 32, while a new stack of filled collecting crates 30 is replaced in buffer 31 from stacker 34. While buffer 31 thus initially comprises empty collecting crates 30, it is gradually filled with filled collecting crates 30 during harvesting in that empty collecting crates 30 are removed and filled collecting crates 30 are supplied by crate transport system 41.

As described above, the shown harvesting device 1 has two conveyor tracks 11, each incorporated in one of the frame halves 14A, 14B. A separate crate transport system 41 is arranged for each conveyor track 11, as is visible in FIG. 1. Each crate transport system 41 displaces the collecting crates 30 only in a vertical plane parallel to transport direction T so that the two crate transport systems need not both operate from the same buffer 31. This minimizes the number of operations to which the fruit is subjected, and thereby greatly reduces the risk of damage.

By driving each conveyor track 11 in circular manner a part of this conveyor track 11 will run counter to transport direction T. The running direction of conveyor track 11 is chosen such that conveyor track 11 runs counter to transport direction T on its underside 16. By making the running speed of conveyor track 11 and the displacement speed of harvesting device 1 the same, harvesting bins 12 are stationary on the underside 16 of conveyor track 11 in transport direction T relative to the plants 2 of which the fruit has to be harvested. The running speed is preferably synchronized with the displacement speed of harvesting device 1 so that no or little difference can result between the two speeds. Conveyor track 11 and wheels 4 of harvesting device 1 are for this purpose mutually connected by a mechanical drive line 36. In the shown embodiment this is achieved by a motor 35 which is placed on frame 3 and drives both wheels 4 and conveyor track 11. The wheels of each side 14A, 14B of frame 3 have their own motor 35 which is coupled drivingly to own conveyor track 11 so that, if necessary, motors 35 of the different sides can temporarily run at different speeds in order to rotate harvesting device 1 about a vertical axis. Harvesting device 1 can hereby for instance be aligned with a row of plants 2.

Figure 10:
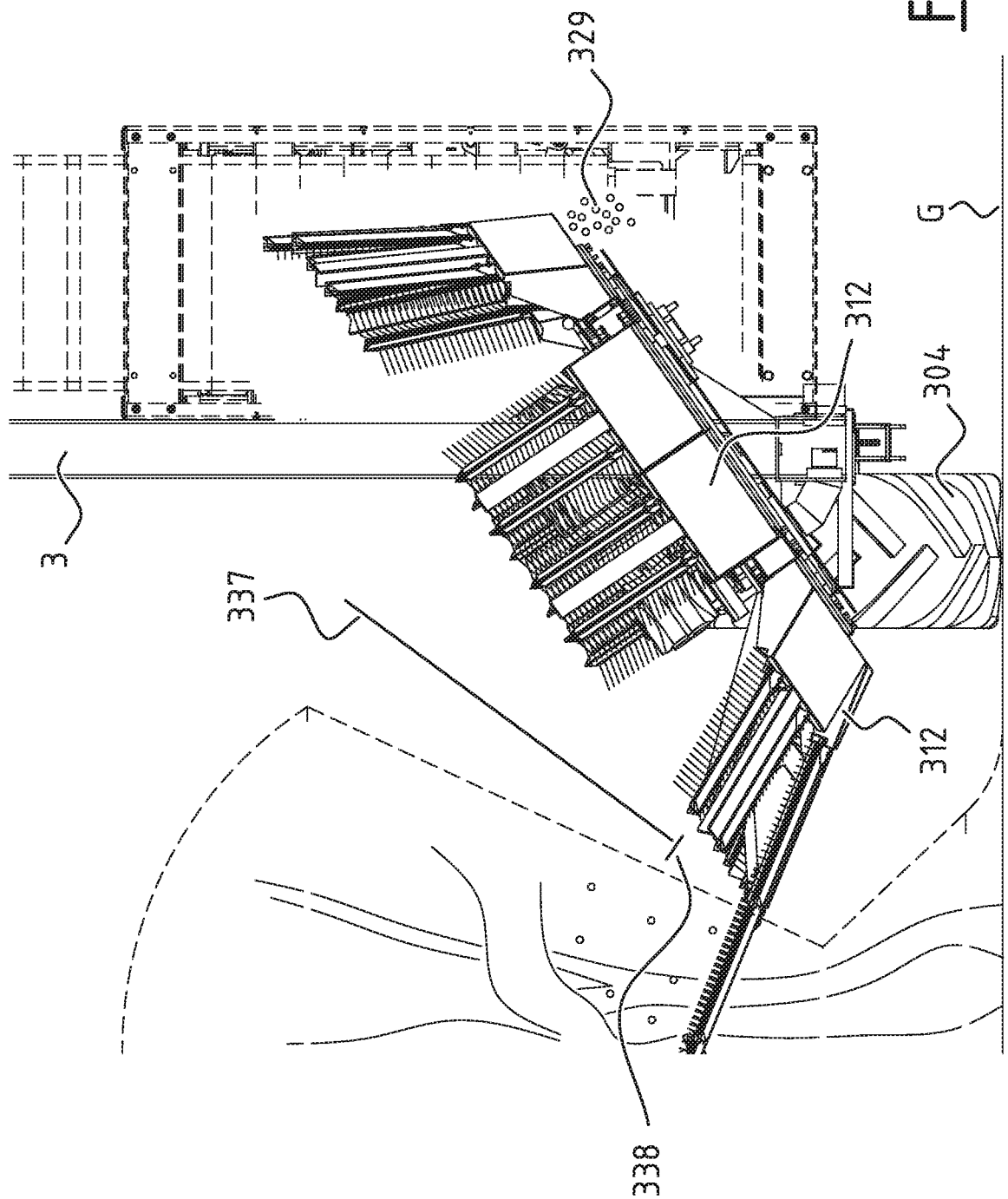
FIG. 10 shows a view corresponding with the right-hand side of FIG. 4 of another embodiment of the harvesting device according to the invention.

FIG. 10 also shows a harvesting device 301 which, unless stated otherwise, is the same as the harvesting device 1 of FIGS. 1-6 and 8-9. Harvesting device 301 has a tarpaulin 337 which is tensioned above the harvesting bins 312 at an angle to the horizon. Tarpaulin 337 extends in the transport direction T. Fruit which falls next to harvesting bins 312 is caught by tarpaulin 337 and, because this tarpaulin is tensioned at an angle to the horizon, guided to harvesting bins 312. Tensioned along tarpaulin 337, in this case on an underside thereof, is a ribbon 338. Ribbon 338 also runs in the transport direction T, along tarpaulin 337. Fruit which is guided down into harvesting bins 312 by tarpaulin 337 is slowed down by ribbon 338 in that it falls thereagainst.

Figure 11:
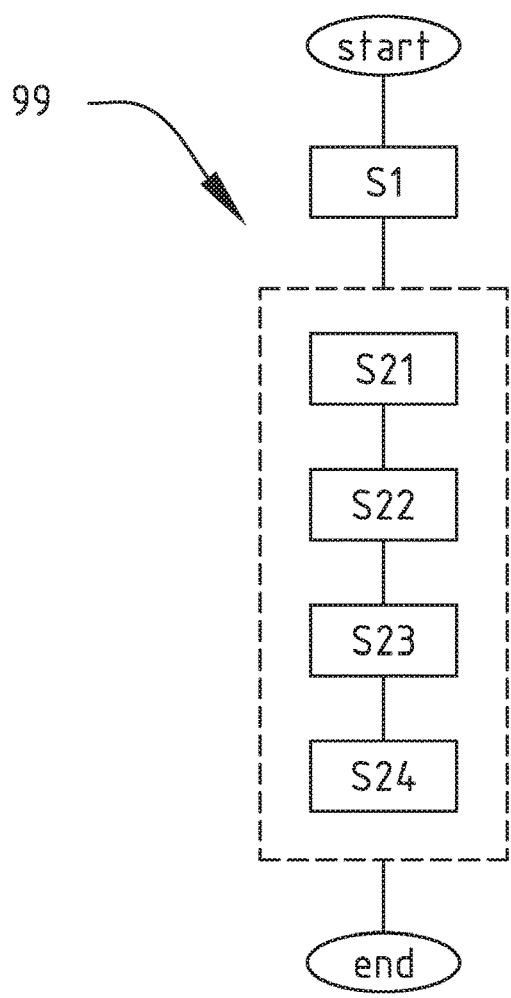
FIG. 11 shows the method according to the invention in a flow diagram.

FIG. 11 shows a method 99 for harvesting fruit hanging from a plant 2 according to the invention in a flow diagram. Upon commencement, method 99 comprises of a first step S1 of displacing a harvesting device as described above toward a plant in a transport direction. This is followed by a second step S2 of driving the at least one conveyor track in circular manner. By performing the second step S2 the at least one harvesting bin is in a first sub-step S21 displaced to a first position lying close to an underside of the plant.

After this, in a second sub-step S22 the at least one harvesting bin is held in the first position, and the plant is simultaneously shaken so that fruit therefrom falls into the at least one harvesting bin. In a third sub-step S23 the at least one harvesting bin is displaced to a second position, in which the at least one harvesting bin is removed further from the plant than in the first position and is situated higher than in the first position. In a fourth, and in this embodiment final, sub-step S24 the at least one harvesting bin is emptied in the second position.

The harvesting device 1 according to the invention thus makes it possible to semi-mechanically harvest fruit quickly and with little work effort. Harvesting losses as a result of fruit falling onto the ground can here be minimized. The risk of damage to the harvested fruit can also be greatly reduced compared to conventional harvesting devices in that the number of operations to which the fruit is subjected is kept as small as possible. The quality of fruit harvested using this device is therefore good enough for it to be sold as fresh fruit, whereas mechanically harvested fruit has heretofore usually been damaged so badly that it has only been suitable for industrial processing. Both the volume of the harvest and the value of the harvested fruit are thus increased, whereby the proceeds are thus increased considerably.

The invention is not limited to the embodiments described above or shown in the figures, but also extends to that defined in the claims which now follow.

The invention claimed is:

1. A harvesting device for harvesting fruit hanging from a plant, comprising:
   a frame which is displaceable in a transport direction and carries a loop-like conveyor track which can be driven in circular manner; and
   at least one harvesting bin connected to the conveyor track,
   wherein the conveyor track lies in a plane which is substantially parallel to the transport direction and which lies at a first acute angle to the horizon in a direction transversely of the transport direction during normal use of the harvesting device,
   wherein the harvesting device further comprises a plurality of harvesting bins and a plurality of catchers, wherein adjacent harvesting bins and catchers connect at least substantially to each other along at least a part of the conveyor track,
   wherein the conveyor track has a substantially linear harvesting segment extending substantially in the transport direction along a lower side thereof, and the harvesting device further comprises a first guide placed along the harvesting segment for the purpose of displacing the at least one harvesting bin and/or the at least one catcher in a direction of extension relative to the conveyor track, and
   wherein the first guide is configured, while the harvesting bin and/or the catcher is being displaced along the harvesting segment counter to the transport direction by the conveyor track, to:
   first move the harvesting bin and/or the catcher away from the conveyor track in the direction of extension;
   hold the harvesting bin and/or the catcher away from the conveyor track while the harvesting bin is being displaced along at least a portion of the harvesting segment; and then
   displace the harvesting bin and/or the catcher back toward the conveyor track counter to the direction of extension.

2. The harvesting device according to claim 1, wherein the at least one harvesting bin and/or the at least one catcher is/are reciprocally displaceable over a carrier mounted on the conveyor track, and wherein the carrier comprises a stop for the harvesting bin, which is configured to close the harvesting bin at least partially when the harvesting bin lies against the stop.

3. The harvesting device according to claim 2, wherein the conveyor track further has an unloading segment along an upper side thereof, and the harvesting device further comprises a second guide placed along the unloading segment for the purpose of opening the at least one harvesting bin at least partially by moving it away from the stop.

4. The harvesting device according to claim 3, further comprising a crate transport system configured to pass collecting crates under the unloading segment in or counter to the transport direction for the purpose of catching fruit from the at least one harvesting bin in the collecting crates.

5. The harvesting device according to claim 4, wherein the crate transport system comprises a buffer for one or more stacks of crates, a de-stacker connected to the buffer, a filling track lying under the unloading segment and connecting to the de-stacker, and a stacker connecting to the filling track.

6. The harvesting device according to claim 1, wherein a running speed of the conveyor track is synchronized with a displacement speed of the harvesting device, the device further comprising a motor which is placed on the frame and is connected drivingly to both the conveyor track and a first chassis carrying the frame.

7. The harvesting device according to claim 1, wherein the conveyor track comprises a chain.

8. The harvesting device according to claim 1, provided with two substantially identical conveyor tracks with the at least one harvesting bin connected thereto, which conveyor tracks are removed from each other in a horizontal direction transversely of the transport direction and are driveable in circular manner in opposite direction, wherein the frame forms a gantry which is displaceable over a row of plants, wherein the two conveyor tracks each lie on one side of the gantry.

9. The harvesting device according to claim 1, further comprising at least one platform which is mounted on the frame and is configured to carry workers, wherein the at least one platform is placed within the periphery of the at least one conveyor track.

10. The harvesting device according to claim 1, further provided with displacing means for displacing the harvesting device transversely of the transport direction; wherein the displacing means comprise a collapsible and extendable second chassis; and wherein the frame is carried by a first chassis and the harvesting device is further provided with lifting means for lifting and lowering the frame relative to the first chassis or second chassis.

11. The harvesting device according to claim 1, further comprising a tarpaulin tensioned above the at least one harvesting bin at an angle to the horizon for the purpose of catching fruit out of reach of the at least one harvesting bin and guiding it to the at least one harvesting bin, and a ribbon tensioned along the tarpaulin for the purpose of slowing down fruit caught by the tarpaulin.

12. The harvesting device according to claim 1, wherein:
   the harvesting device is also displaceable counter to the transport direction; and
   the at least one conveyor track is driveable in circular manner in two directions.

13. A method for harvesting fruit hanging from a plant, comprising the steps of:

displacing the harvesting device according to claim 1 toward a plant in a transport direction; and driving the at least one conveyor track in circular manner, and thereby:

displacing the at least one harvesting bin to a first position lying close to an underside of the plant;

holding the at least one harvesting bin in the first position at the same time as shaking the plant so that fruit therefrom falls into the at least one harvesting bin or at the same time as picking and dropping fruit so that it falls into the at least one harvesting bin;

displacing the at least one harvesting bin to a second position, in which the at least one harvesting bin is removed further from the plant than in the first position and lies higher than in the first position; and emptying the at least one harvesting bin in the second position.

14. A harvesting device for harvesting fruit hanging from a plant, comprising:

a frame which is displaceable in a transport direction and carries a loop-like conveyor track which can be driven in circular manner; and at least one harvesting bin connected to the conveyor track, wherein the conveyor track lies in a plane which is substantially parallel to the transport direction and which lies at a first acute angle to the horizon in a direction transversely of the transport direction during normal use of the harvesting device; and wherein at least one catcher:

is mounted on the at least one harvesting bin, comprises a flexible catching element for catching fruit and guiding it to the harvesting bin, and is displaceable relative to the conveyor track in a direction of extension substantially transversely of the transport direction;

wherein the at least one harvesting bin and/or the at least one catcher is/are reciprocally displaceable over a carrier mounted on the conveyor track; and wherein the carrier is mounted non-rotatably on the conveyor track and extends substantially transversely of a local longitudinal direction of the conveyor track, and encloses a second angle with an extension of the plane in which the conveyor track lies, wherein the second angle is greater than the first angle.

15. The harvesting device according to claim 14, wherein the carrier comprises a stop for the at least one harvesting bin, which is configured to close the at least one harvesting bin at least partially when the at least one harvesting bin lies against the stop.

16. The harvesting device according to claim 15, wherein the conveyor track has an unloading segment along an upper side thereof, and the harvesting device comprises a guide placed along the unloading segment for the purpose of opening the at least one harvesting bin at least partially by moving it away from the stop.

17. The harvesting device according to claim 16, further comprising a crate transport system configured to pass collecting crates under the unloading segment in or counter to the transport direction for the purpose of catching fruit from the at least one harvesting bin in the collecting crates.

18. The harvesting device according to claim 17, wherein the crate transport system comprises a buffer for one or more stacks of crates, a de-stacker connected to the buffer, a filling track lying under the unloading segment and connecting to the de-stacker, and a stacker connecting to the filling track.

19. The harvesting device according to claim 14, further provided with displacing means for displacing the harvesting device transversely of the transport direction; wherein the displacing means comprise a collapsible and extendable second chassis; and wherein the frame is carried by a first chassis and the harvesting device is further provided with lifting means for lifting and lowering the frame relative to the first chassis or second chassis.

20. The harvesting device according to claim 14, wherein:

the harvesting device is also displaceable counter to the transport direction; and the at least one conveyor track is driveable in circular manner in two directions.

\* \* \* \* \*